Dec. 30, 1930.   H. GLAENZER ET AL   1,787,368
SELF PROPELLED RAILWAY VEHICLE
Filed Oct. 31, 1928
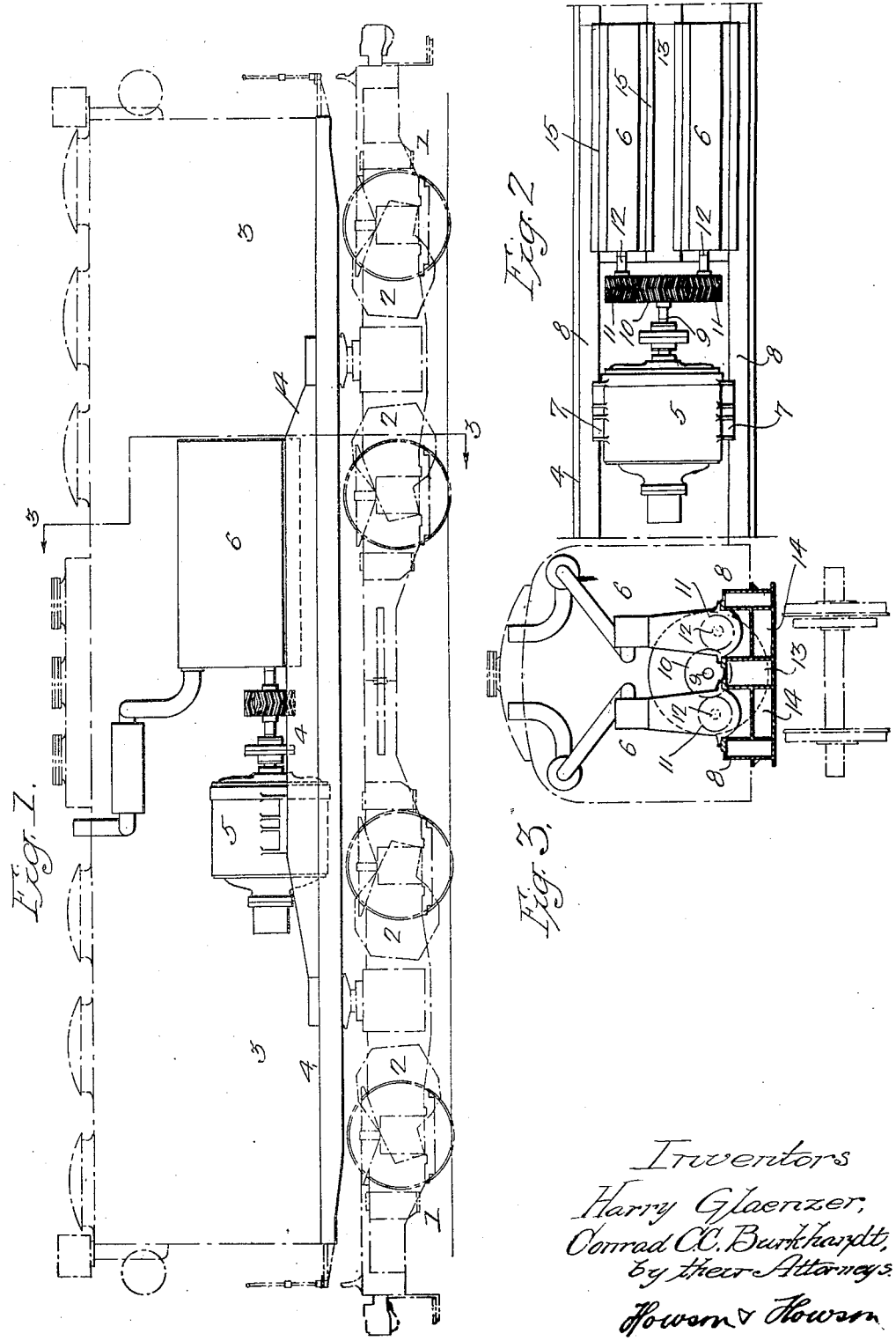
Inventors
Harry Glaenzer,
Conrad C.C. Burkhardt,
by their Attorneys
Howson & Howson Patented Dec. 30, 1930

1,787,368

UNITED STATES PATENT OFFICE

HARRY GLAENZER AND CONRAD C. C. BURKHARDT, OF PHILADELPHIA, PENNSYLVANIA

SELF-PROPELLED RAILWAY VEHICLE

Application filed October 31, 1928. Serial No. 316,138.

Our invention relates to that type of self-propelled vehicle having an electric generator in the cab driven by an internal combustion engine.

One object of our invention is to use two internal combustion engines with a single electric generator.

A further object of the invention is to arrange the internal combustion engines so as to save space in the locomotive cab and to allow for the use of a large generator.

The invention also relates to the frame which supports the generator and engines.

In the accompanying drawing:

Fig. 1 illustrates the self-propelled railway vehicle in dotted lines, and the engines and generator in full lines;

Fig. 2 is a plan view of a portion of Fig. 1, showing the two internal combustion engines arranged side-by-side and geared to the shaft of the generator; and Fig. 3 is a transverse sectional view on the line 3—3, Fig. 1.

Referring to the drawing, 1—1 are the trucks, which are shown in dotted lines. 2—2 are the motors mounted on the trucks. The body portion 3 may be of any suitable form, and on this body is a frame 4 which supports the electric generator 5 and the two internal combustion engines 6—6. The frame is higher at the centre than at its ends, so that the engines and generator mounted thereon will clear the trucks. This construction, furthermore, makes a very substantial frame for supporting the load.

The generator 5 is of large size and has laterally projecting feet 7—7, which rest upon the longitudinal rails 8—8 of the frame 4. On the shaft 9 of the generator is a gear-wheel 10 which meshes with pinions 11—11 on the shafts 12—12 of the two internal combustion engines 6—6. This gearing can be of such ratio that either a reduction ascending or a reduction descending can be had, so that a high speed generator of low weight and minimum dimensions can be used with either high speed or low speed engines. The gears, in the present instance, are of the herringbone type as shown.

The frame 4, in addition to having two side rails 8—8, also has an intermediate longitudinal rail 13 which is connected to the side rails by a hollow base structure 14. The frame is of a box-like formation, making a very rigid and substantial support for the engines and the generator.

The side flanges or feet 15 of the engine structures rest upon the side rails 8—8 and the intermediate rail 13.

By the above construction, two comparatively small engines of high speed and light weight can be used, in place of a very heavy and cumbersome engine of the same horsepower but lower speed. These engines are geared to a generator of a large size. There is also a slight advantage in efficiency in using one generator of double the power of two smaller ones. Furthermore, a saving in space in the locomotive cab accrues from the arrangement described.

We claim:—

1. The combination in a self-propelled railway vehicle, of two trucks; a frame supported on the trucks, said frame having side rails; a generator located between the side rails and supported thereby, said frame also having an intermediate rail extending part of the length of the frame; two engines arranged side-by-side and resting on the side rails and intermediate rail; and gearing between both engines and the generator.

2. The combination in a self-propelled railway vehicle, of two trucks with motors mounted thereon; a frame carried by the trucks and having raised side rails and a longitudinal intermediate rail extending part of the length of the frame; a generator having feet resting on the rails, the generator being suspended between the side rails of the frame; two internal combustion engines mounted side-by-side on the side rails and the intermediate rail; a pinion on the shaft of each engine; and a gear-wheel on the shaft of the generator meshing with the pinions.

3. A frame for a self-propelled vehicle arranged to be mounted on trucks, said frame having raised side rails box-like in form; an intermediate rail also box-like in form and extending parallel with the side rails; and a base structure connecting the intermediate rail with the side rails, said frame being arranged to support a generator and two engines.

HARRY GLAENZER.
CONRAD C. C. BURKHARDT.